(12) United States Patent
Campbell et al.

(10) Patent No.: US 10,973,342 B2
(45) Date of Patent: Apr. 13, 2021

(54) ADJUSTABLE BED WITH IMPROVED POWER MANAGEMENT

(71) Applicant: ASCION, LLC, Bloomfield Hills, MI (US)

(72) Inventors: Alex Campbell, Livonia, MI (US); Martin B. Rawls-Meehan, Birmingham, MI (US)

(73) Assignee: ASCION, LLC, Bloomfield Hills, MI (US)

( * ) Notice: Subject to any disclaimer, the term of this patent is extended or adjusted under 35 U.S.C. 154(b) by 685 days.

(21) Appl. No.: 15/585,392

(22) Filed: May 3, 2017

(65) Prior Publication Data

US 2017/0318982 A1 Nov. 9, 2017

Related U.S. Application Data

(60) Provisional application No. 62/331,559, filed on May 4, 2016.

(51) Int. Cl.

| | |
|---|---|
| *A47C 20/08* | (2006.01) |
| *A61G 7/015* | (2006.01) |
| *A61G 7/018* | (2006.01) |
| *A47C 31/00* | (2006.01) |
| *A47C 21/00* | (2006.01) |
| *H02J 7/02* | (2016.01) |
| *H02J 50/10* | (2016.01) |
| *A47C 20/04* | (2006.01) |
| *A61H 23/00* | (2006.01) |

(52) U.S. Cl.
CPC .......... *A47C 31/008* (2013.01); *A47C 20/041* (2013.01); *A47C 20/08* (2013.01); *A47C 21/003* (2013.01); *A61H 23/004* (2013.01); *H02J 7/025* (2013.01); *H02J 50/10* (2016.02)

(58) Field of Classification Search
CPC ...... A47C 20/041; A47C 20/08; A61G 7/015; A61G 7/018
See application file for complete search history.

(56) References Cited

U.S. PATENT DOCUMENTS

| | | | |
|---|---|---|---|
| 4,944,056 A | * | 7/1990 | Schroeder ............ A61G 7/1015 5/85.1 |
| 7,321,811 B1 | | 1/2008 | Rawls-Meehan |
| 7,465,280 B2 | | 12/2008 | Rawls-Meehan |

(Continued)

*Primary Examiner* — Peter M. Cuomo
*Assistant Examiner* — Ifeolu A Adeboyejo
(74) *Attorney, Agent, or Firm* — Marshall, Gerstein & Borun LLP

(57) ABSTRACT

The disclosure generally relates to an adjustable bed, in particular incorporating improved power management systems. In various embodiments, an adjustable bed can include a wirelessly chargeable remote control unit, one or more pulse width modulator units to provide DC power at a variety of voltages appropriate for varied peripheral electrical components of the bed, and/or a battery backup unit providing power to the bed in addition to a mains power input. The various power management systems can reduce wire clutter for peripheral electrical components, permit a wider range of peripheral electrical components to be driven by a single power supply, provide for adjustable bed operation in the absence of mains power supply, and reduce power consumption in different operation modes.

14 Claims, 3 Drawing Sheets

(56) References Cited

U.S. PATENT DOCUMENTS

| | | |
|---|---|---|
| 7,805,785 B2 | 10/2010 | Rawls-Meehan |
| 7,930,783 B2 | 4/2011 | Rawls-Meehan |
| 7,933,669 B2 | 4/2011 | Rawls-Meehan |
| 7,979,169 B2 | 7/2011 | Rawls-Meehan |
| 8,019,486 B2 | 9/2011 | Rawls-Meehan |
| 8,032,263 B2 | 10/2011 | Rawls-Meehan |
| 8,032,960 B2 | 10/2011 | Rawls-Meehan |
| 8,046,114 B2 | 10/2011 | Rawls-Meehan |
| 8,046,115 B2 | 10/2011 | Rawls-Meehan |
| 8,046,116 B2 | 10/2011 | Rawls-Meehan |
| 8,046,117 B2 | 10/2011 | Rawls-Meehan |
| 8,050,805 B2 | 11/2011 | Rawls-Meehan |
| 8,069,512 B2 | 12/2011 | Rawls-Meehan |
| 8,078,336 B2 | 12/2011 | Rawls-Meehan |
| 8,078,337 B2 | 12/2011 | Rawls-Meehan |
| 8,150,562 B2 | 4/2012 | Rawls-Meehan |
| 8,239,984 B2 * | 8/2012 | Hopke .................. A47D 9/02 5/109 |
| 8,375,488 B2 | 2/2013 | Rawls-Meehan |
| 8,565,934 B2 | 10/2013 | Rawls-Meehan |
| 8,682,457 B2 | 3/2014 | Rawls-Meehan |
| 2002/0059679 A1* | 5/2002 | Weismiller .......... A61G 7/0528 5/610 |
| 2004/0133982 A1* | 7/2004 | Horitani .............. A47C 20/041 5/618 |
| 2008/0289108 A1* | 11/2008 | Menkedick .......... A61G 7/0528 5/610 |
| 2009/0237264 A1* | 9/2009 | Bobey ................ A61G 7/05776 340/815.69 |
| 2011/0087416 A1* | 4/2011 | Patmore ................ A61G 1/048 701/93 |
| 2012/0057685 A1 | 3/2012 | Rawls-Meehan |
| 2012/0060290 A1* | 3/2012 | Jones ................ A61G 13/0018 5/611 |
| 2014/0259410 A1* | 9/2014 | Zerhusen ............. A61G 7/0506 5/600 |

* cited by examiner

ADJUSTABLE BED WITH IMPROVED POWER MANAGEMENT

CROSS REFERENCE TO RELATED APPLICATION

Priority is claimed to U.S. Provisional Application No. 62/331,559 filed on May 4, 2016, which is incorporated by reference herein in its entirety.

STATEMENT OF GOVERNMENT INTEREST

None.

BACKGROUND OF THE DISCLOSURE

Field of the Disclosure

The disclosure generally relates to an adjustable bed, in particular incorporating improved power management systems. In various embodiments, an adjustable bed can include a wirelessly chargeable remote control unit, one or more pulse width modulator units to provide DC power at a variety of voltages appropriate for varied peripheral electrical components of the bed, and/or a battery backup unit providing power to the bed in addition to a mains power input.

SUMMARY

In one aspect, the disclosure relates to an adjustable bed comprising: (a) a mattress support surface comprising (i) a first deck support section, and (ii) a second deck support section pivotally attached to the first deck support section; (b) a control box adapted to wirelessly receive a position control signal for adjusting the position of one or more deck support sections; (c) a (handheld) wireless remote control adapted to wirelessly transmit the position control signal, the remote control comprising (i) a rechargeable battery adapted to power the wireless transmission of the control signal and (ii) a wireless charging induction coil electrically coupled to the rechargeable battery and adapted to receive an inductively coupled wireless transmission to electrically charge the rechargeable battery; and (d) a wireless charger comprising an induction coil (e.g., copper or other suitable metal or electrically conductive wire/coil) adapted to inductively couple with the induction coil of the remote control (e.g., to induce a current in the remote control coil and charge the remote control battery).

Various refinements of the adjustable bed with a wireless charging system are possible. In a refinement, the wireless charger comprises a USB power input port coupled to the induction coil of the wireless charger and adapted to receive power threrefor. In another refinement, the wireless charger is separate from the mattress support surface and corresponding support structure for the adjustable bed. In another refinement, (i) the wireless charger comprises a USB power input port coupled to the induction coil of the wireless charger and adapted to receive power threrefor; (ii) the adjustable bed further comprises a power supply and a USB power output port coupled thereto; and (iii) the USB power input port of the wireless charger is electrically coupled (e.g., wired) to the USB power output port of the adjustable bed. In another refinement, the wireless charger is integrated with the mattress support surface or a corresponding support structure for the adjustable bed. In another refinement, the rechargeable battery is selected from the group consisting of a lithium ion battery, a lithium polymer battery, a lead acid battery, nickel cadmium battery, and a nickel metal hydride battery.

In another aspect, the disclosure relates to an adjustable bed comprising: (a) a mattress support surface comprising (i) a first deck support section, and (ii) a second deck support section pivotally attached to the first deck support section; (b) a power supply adapted to receive a continuous source of input power; (c) a first peripheral adjustable bed component in electrical communication (e.g., wired) with the power supply and adapted to receive a DC source of input power at the delivery voltage; (d) a second pulse width modulator adapted to reduce the delivery voltage of the power supply; and (e) a second peripheral adjustable bed component in electrical communication with the power supply and the second PWM, the second peripheral adjustable bed component being adapted to receive a DC source of input power at a second voltage less than the delivery voltage (e.g., a second voltage down-regulated by the PWM). Optionally, the adjustable bed further comprises (f) a third pulse width modulator (e.g., can be the same or different physical unit as the second PWM) adapted to reduce the delivery voltage of the power supply; and (e) a third peripheral adjustable bed component in electrical communication with the power supply and the third PWM, the third peripheral adjustable bed component being adapted to receive a DC source of input power at a third voltage less than the delivery voltage (e.g., a third voltage down-regulated by the PWM; third voltage can be the same or different from the second voltage).

Various refinements of the adjustable bed including power supply voltage regulation are possible. In a refinement, the delivery voltage is selected from the group consisting of 24V and 36V. In another refinement, the second voltage and the third voltage (when present with the third PWM) are independently selected from the group consisting of 24V, 12V, 5V, and 3.3V (e.g., a voltage reduced by at least 12V, 19V, 24V, or 31V relative to the delivery voltage). In another refinement, the first, second, and third (when present) peripheral adjustable bed components are selected from the group consisting of an actuator motor (e.g., first peripheral; 24V or 36V input), a vibrator motor (e.g., second or third peripheral; 12V or 24V input), lights (e.g., bed-mounted (LED) lights as the second or third peripheral; 24V, 12V, or 5V input), an audio and/or visual system (e.g., speakers/ audio player and/or video player as the second or third peripheral; 24V, 12V, or 5V input), a control box (e.g., PLC controller as any peripheral; 36V, 24V, 12V, or 5V input), a wireless charger unit (e.g., second or third peripheral; 12V, 5V, or 3.3V input), and a USB charging port (e.g., second or third peripheral; 5V or 3.3V input). In another refinement, the first peripheral adjustable bed component is an actuator motor, for example where the second and third (when present) peripheral adjustable bed components are selected from the group consisting of a vibrator motor, lights, audio and/or visual system, a control box, a wireless charger unit, a USB charging port In another aspect, the disclosure relates to an adjustable bed comprising: (a) a mattress support surface comprising (i) a first deck support section, and (ii) a second deck support section pivotally attached to the first deck support section; (b) a power supply adapted to receive a continuous source of input power and adapted to deliver a direct current (DC) source of output power at a delivery voltage); (c) a first pulse width modulator adapted to reduce the delivery voltage of the power supply; (d) a first peripheral adjustable bed component in electrical communication with the power supply and the first PWM, the first peripheral adjustable bed component being adapted to receive a DC source of input power at a first voltage less than the delivery voltage (e.g., a first voltage down-regulated by the PWM); (e) a second pulse width modulator adapted to reduce the delivery voltage of the power supply; and (f) a second peripheral adjustable bed component in electrical communication with the power supply and the second PWM, the second peripheral adjustable bed component being adapted to receive a DC source of input power at a second voltage less than the delivery voltage (e.g., a second voltage down-regulated by the PWM; can be the same or different than the first voltage).

Various refinements of the adjustable bed including power supply voltage regulation are possible. In a refinement, the delivery voltage is selected from the group consisting of 24V and 36V. In another refinement, the first voltage and the second voltage are independently selected from the group consisting of 24V, 12V, 5V, and 3.3V (e.g., a voltage reduced by at least 12V, 19V, 24V, or 31V relative to the delivery voltage). In another refinement, the first and second peripheral adjustable bed components are selected from the group consisting of and actuator motor, a vibrator motor, lights, an audio and/or visual system, a control box, a wireless charger unit, and a USB charging port.

In another aspect, the disclosure relates to an adjustable bed comprising: (a) a mattress support surface comprising (i) a first deck support section, and (ii) a second deck support section pivotally attached to the first deck support section; (b) a power supply adapted to receive a continuous source of input power and adapted to deliver a direct current (DC) source of output power at a first delivery voltage to a peripheral adjustable bed component in electrical connection therewith; and (c) a rechargeable or non-rechargeable backup battery adapted to deliver a direct current (DC) source of output power at a second delivery voltage to the peripheral adjustable bed component in electrical connection therewith.

Various refinements of the adjustable bed including battery backup are possible. In a refinement, the first and second delivery voltages are independently selected from the group consisting of 24V and 36V (e.g., first delivery voltage greater than that of the second delivery voltage). In another refinement, the second delivery voltage is 24V (e.g., further including one or more PWM units for voltage reduction for peripherals connected thereto). In another refinement, the battery is selected from the group consisting of a lithium ion battery, a lithium polymer battery, a lead acid battery, nickel cadmium battery, and a nickel metal hydride battery (e.g., 24V battery).

Various refinements of the adjustable bed and foundation are possible in any of its various aspects. In a refinement, the adjustable bed further comprises a mattress having an outer bottom surface and positioned above the mattress support surface. In another refinement, the mattress support surface further comprises (iii) a third deck support section pivotally attached to the second deck support section, and (iv) optionally a fourth deck support section pivotally attached to the third deck support section.

Additional features of the disclosure may become apparent to those skilled in the art from a review of the following detailed description, taken in conjunction with the drawings, examples, and appended claims.

BRIEF DESCRIPTION OF THE DRAWINGS

For a more complete understanding of the disclosure, reference should be made to the following detailed description and accompanying drawings wherein.

While the disclosed apparatus and methods and are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

DETAILED DESCRIPTION

The disclosure generally relates to an adjustable bed, in particular incorporating improved power management systems. In some embodiments, an adjustable bed can include a wirelessly chargeable remote control unit and a wireless charging unit. In other embodiments, an adjustable bed can include one or more pulse width modulator units to provide DC power at a variety of voltages appropriate for varied peripheral electrical components of the bed, in particular where the provided voltages are at reduced level relative to that provided by the power supply of the bed. In other embodiments, an adjustable bed can include a battery backup unit providing power to the bed in addition to a mains power input and corresponding power supply unit. The various power management systems can reduce wire clutter for peripheral electrical components, permit a wider range of peripheral electrical components to be driven by a single power supply, provide for adjustable bed operation in the absence of mains power supply, and reduce power consumption in different operation modes.

Figure 1:
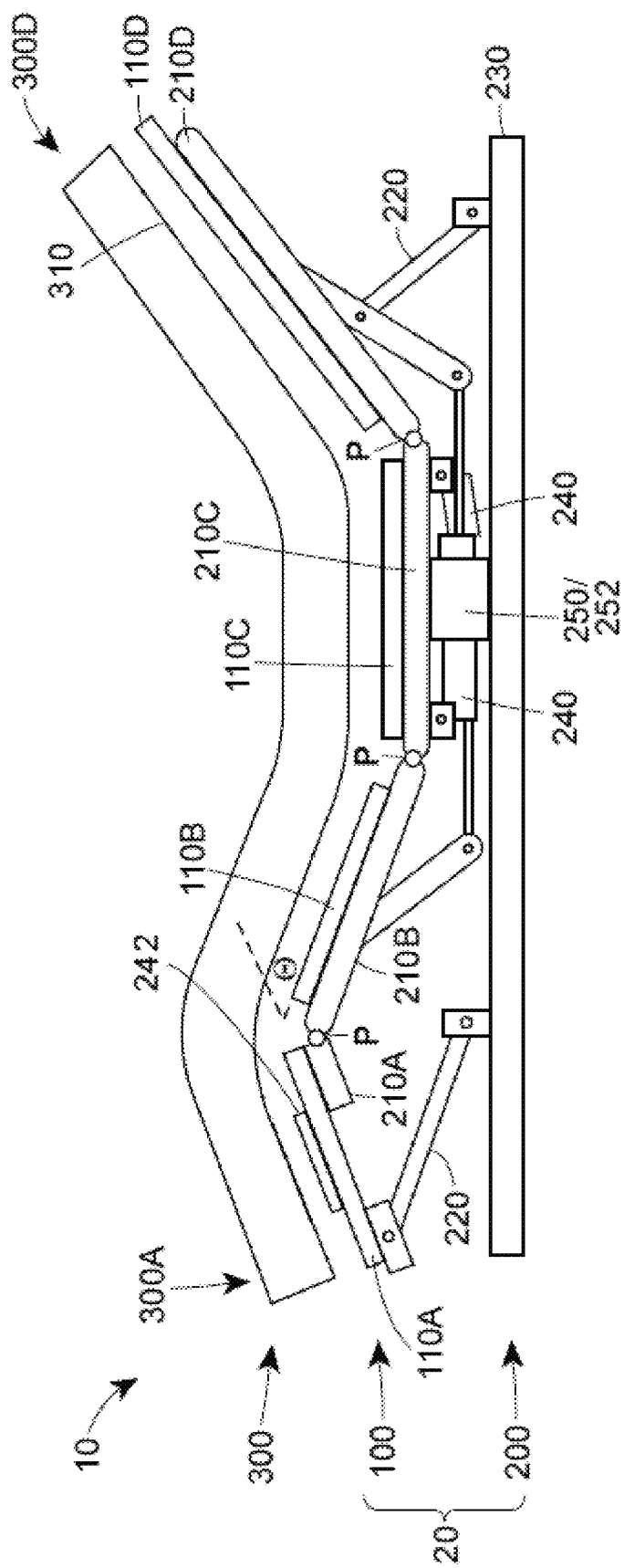
FIG. 1 is a side view of an adjustable bed including an adjustable foundation and a mattress according to the disclosure.
Figure 2:
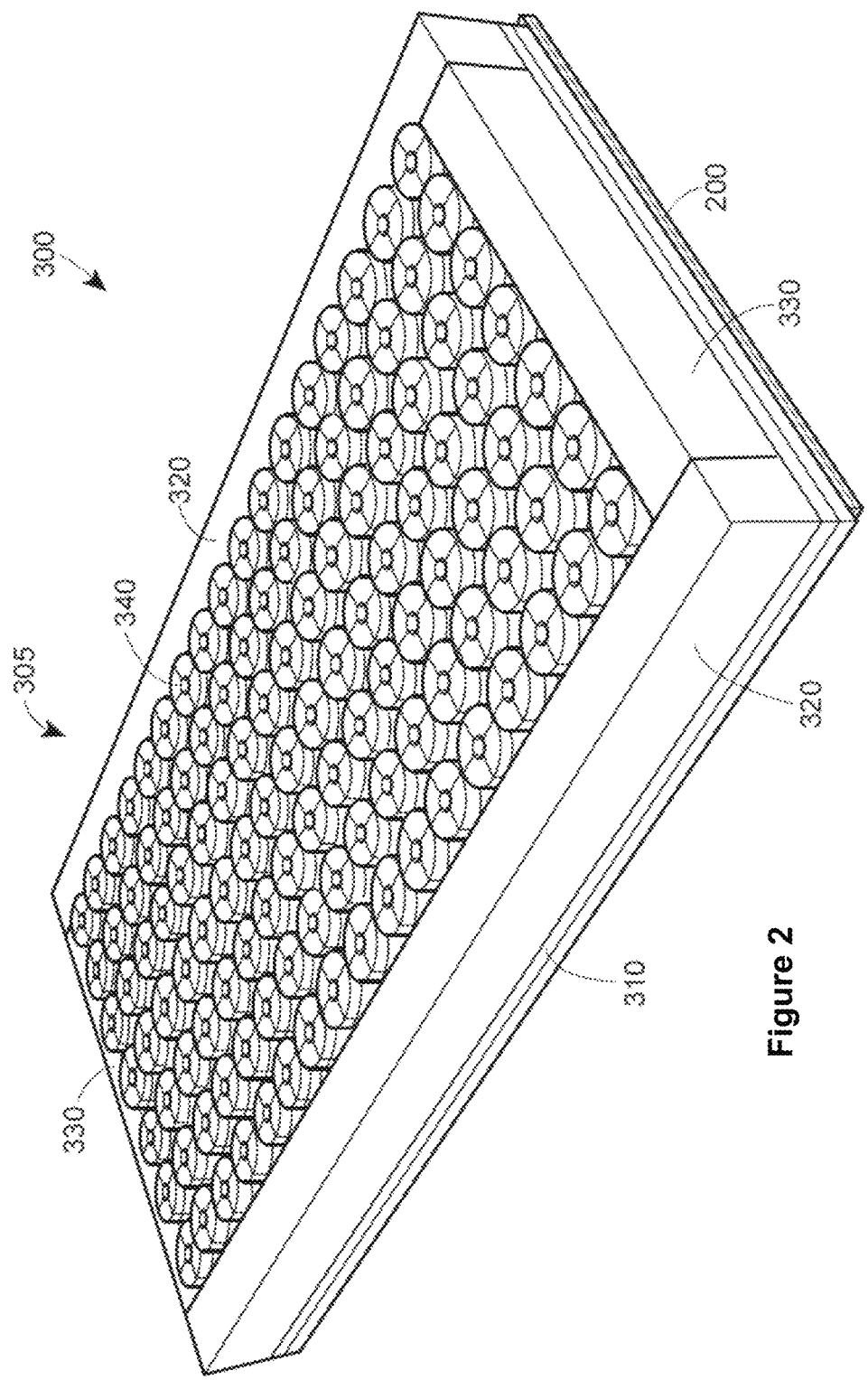
FIG. 2 is a top perspective illustration of a mattress according to the disclosure.

FIG. 1 is a side view of an adjustable bed 10 according to the disclosure. The illustrated adjustable bed 10 includes an adjustable foundation 20 (e.g., adjustable bed foundation), and a mattress 300 sitting atop the adjustable foundation 20. The adjustable foundation 20 can include a mattress support (or deck) 100 mounted to an adjustable frame 200. FIG. 2 is a top perspective illustration of a mattress 300 according to the disclosure.

The mattress support 100 includes a deck support 110 platform, for example including a plurality of deck support sections 110A-110D as illustrated. A deck support platform 110 formed from a plurality of deck support sections 110A-110D, each having a corresponding upper surface 112A-112D (i.e., the surface which supports the mattress 300) is suitable for the adjustable foundation 20. In the illustrated embodiment, section 110A corresponds to the foot portion of the bed, section 110B corresponds to the leg portion of the bed, section 110C corresponds to the bottom portion of the bed, and section 110D corresponds to the head and neck portion of the bed 10 (i.e., where the sections correspond to the body portion of a user laying on the bed 10/mattress 300 in a normal use orientation). Each section 110A-110D includes longitudinally opposed ends $110A_1$ and $110A_2$, $110B_1$ and $110B_2$, $110C_1$ and $110C_2$, $110D_1$ and $110D_2$, respectively, where the longitudinal direction Y is generally defined as being perpendicular to the pivot axis P (described below) and/or along the mattress support 100 length or mattress 300 length. Each deck support section 110A-110D can be pivotally attached to one or more adjacent sections (e.g., directly or indirectly via underlying frame 200 structure as described below), thus allowing each section 110A-110D to rotate independently around the lateral pivot axis P (e.g., an axis generally in the lateral direction X and perpendicular to the longitudinal direction Y). The mattress support 100 generally includes at least two deck support sections, for example including a first (foot) support section 110A, a second (leg) support section 110B pivotally attached to the first section 110A, a third (bottom) support section 110C pivotally attached to the second section 110B, and a fourth (head/neck) support section 110D pivotally attached to the third section 110C as shown in FIG. 1. In other embodiments (not shown), the mattress support 100 can have fewer or more support sections (e.g., a first (foot) support section, a second (leg and bottom) support section pivotally attached thereto, and a third (head/neck) support section pivotally attached thereto). In some embodiments the support sections 110A-110D can be formed from a rigid support material such as wood or metal. In other embodiments the support sections 110A-110D can be formed from a flexible fabric or padding material (e.g., alone or in combination with a rigid support material, such as a cover or padding for an underlying rigid support material).

The adjustable frame 200 generally provides the mechanical, electrical, and electronic support and articulation components for the adjustable foundation 20 and bed 10. As illustrated, the adjustable frame 200 includes a frame support 210, for example including a plurality of frame support sections 210A-210D as illustrated and corresponding to the deck support sections 110A-110D. Each deck support section 110A-110D can be fixedly or removably mounted (e.g., via bolts, screws, or other fastener or adhesive components) to its underlying frame support section 210A-210D such that when one or more frame support sections 210A-210D are articulated, the deck support sections 110A-110D are correspondingly articulated. As illustrated, each frame support section 210A-210D can be pivotally attached at a pivot axis P to one or more adjacent sections (e.g., directly as illustrated and providing an indirect pivotal attachment for corresponding deck support sections), thus allowing each section 210A-210D to rotate independently around the lateral pivot axis P. The adjustable frame 200 generally includes at least two frame support sections, for example including a first (foot) support section 210A, a second (leg) support section 210B pivotally attached to the first section 210A, a third (bottom) support section 210C pivotally attached to the second section 210B, and a fourth (head/neck) support section 210D pivotally attached to the third section 210C as shown in FIG. 1. In other embodiments (not shown), the adjustable frame 200 can have fewer or more frame support sections (e.g., a first (foot) support section, a second (leg and bottom) support section pivotally attached thereto, and a third (head/neck) support section pivotally attached thereto).

As illustrated, the adjustable frame 200 further includes a subframe 230, for example a rigid, non-articulatable frame structure which sits on a floor or within a decorative bed frame common in the furniture industry such as a platform bed (e.g., via various leg elements, not shown) and provides stability for the bed foundation 20 as the adjustable frame 200 is articulated to various different positions. The adjustable frame 200 can further include one or more support members 220 connecting structure between the subframe 230 and the frame support 210 and sections 210A-210D thereof. In some embodiments, one or more of the frame sections 210A-210D can be fixed in position relative to the subframe 230 (e.g., bottom section 210C as illustrated) and be unable to rotate or articulate relative to the subframe 230, although other frame sections pivotally attached thereto are able to rotate or articulate. As further illustrated, the adjustable frame 200 can include peripheral components such as one or more actuators 240 (e.g., including a corresponding motor and actuator rod) variously mounted to one or more of the subframe 230, a support member 220, and a frame support section 210A-210D. Similarly, the foundation 20 can include a peripheral component such as a vibration or massage motor 242 mounted to a component of the foundation 20, such as the mattress support 100 (e.g., a deck support section 110 as illustrated) or to the frame 200, which motor can provide massage functionality to one or more sections of the mattress 300. In some embodiments, the subframe 230, the support members 220, and the frame support sections 210A-210D can be formed from metal such as steel. The actuators 240 can be any of those commonly known in the art. The actuators 240 and, correspondingly, the configuration or position of the adjustable frame 200, mattress support 100, and mattress 300 can be controlled and adjusted by a suitable power supply 250, an adjustable bed controller or control box 252 (e.g., programmable logic controller or otherwise), and a remote control 410 to deliver repositioning commands. The power supply 250 can be mounted to a support structure of the adjustable bed 10 such as the frame 200 or other foundation 20 component, and it is adapted to receive a continuous source of input power (e.g., alternating current such as mains power supply at about 110V, 120V, 220V, 230V, or 240V and/or at about 50 Hz or 60 Hz), and it is adapted to deliver a direct current (DC) source of output power at a specified or otherwise relatively consistent delivery voltage (e.g., the power supply can be a standard AC-to-DC converter). The output delivery voltage from the power supply suitably is 24V or 36V DC. The controller/control box 252 is adapted to wirelessly receive (and optionally transmit for feedback control) a position control signal for adjusting the position of one or more deck support sections 110 via a suitable wireless protocol such as general radio frequency (RF), WIFI (e.g., IEEE 802.11 standard), or BLUETOOTH (e.g., UHF RF signal in the 2.4-2.485 GHz range) protocols. The controller/control box 252 can be mounted to the adjustable bed 10 such as on the foundation 20, frame 200, or component thereof. The remote control 410 similarly is adapted to wirelessly transmit (and optionally receive for feedback control) the position control signal to the controller/control box 252 via one or more suitable wireless protocols complementary to those of the controller/control box 252.

The mattress 300 is not particularly limited, and it can be a conventional mattress 300 (e.g., a spring or coil mattress, memory foam mattress, air mattress) with a base 310 (e.g., a continuous fabric material) suitable for use on a mattress support structure such as a fixed bed frame or an adjustable bed frame. In the illustrated embodiment, the mattress 300 includes a mattress containment frame 305 including a plurality of foam cells (or foam springs) 340 positioned in the frame 305 to provide the sleeping support surface for the mattress. The mattress containment frame 305 includes a lower/bottom base 310, sidewalls 320, and endwalls 330 which generally define the interior frame 305 volume housing the foam cells 340. The sidewalls 320 and endwalls 330 suitably are formed from a foam material. The base 310 can be a generally continuous fabric material (e.g., a non-woven fabric material). The mattress 300 is generally positioned above the mattress support 100 surface 112, for example sitting directly atop the deck support sections 110A-110D. In other embodiments, other structure between the mattress 300 and mattress support 100 surface 112 can be present, for example a padding or cushion material (e.g., which can be continuous or include openings where corresponding friction-enhancing materials 410, 420 are positioned on the mattress 300 and mattress support 100.

Figure 3:
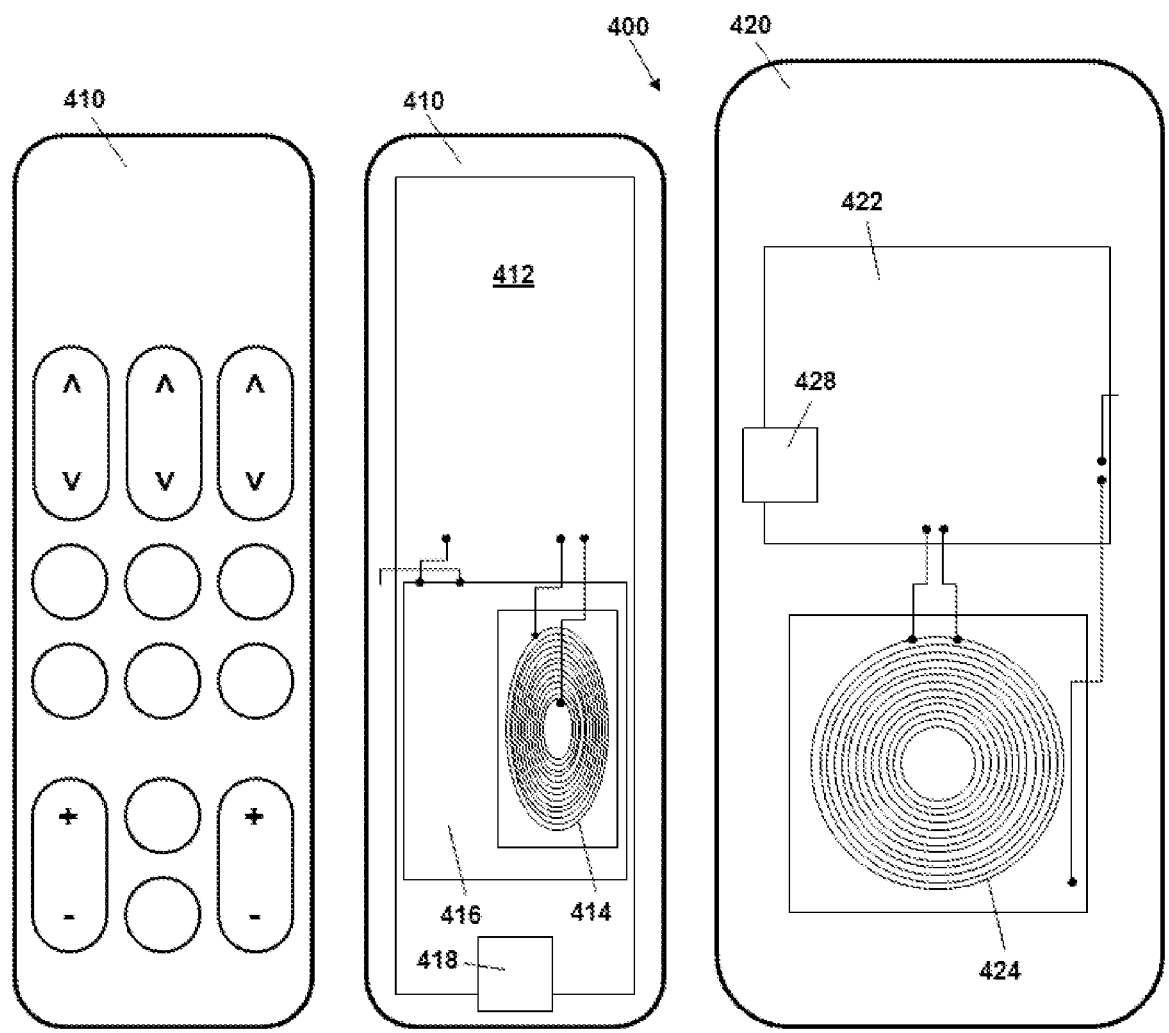
FIG. 3 illustrates a wirelessly chargeable remote control and a wireless charging unit for the same according to the disclosure.

FIG. 3 illustrates a remote control wireless charging system 400 according to the disclosure. The wireless charging system 400 includes a wireless remote control 410 and a wireless charging unit 420. The remote control 410 is suitably a handheld device. As illustrated, it includes an internal remote printed circuit board 412 to which a remote induction coil 414, a remote rechargeable battery 416, and a remote power input port 418 are mounted and in electrical connection with each other. The rechargeable battery 416 is adapted to power the wireless transmission of the control signal to the controller/control box 252. The wireless charging induction coil 414 (e.g., copper or other suitable metal or electrically conductive wire/coil) is electrically coupled to the rechargeable battery 416 (e.g., via wiring or the circuit board) and is adapted to receive an inductively coupled wireless transmission to electrically charge the battery 416. Thus, when the remote 410 is placed near or on a powered wireless charger (or charging unit) 420, the remote 410 battery 416 will charge wirelessly. The rechargeable battery 416 can be any suitable battery know in the art, for example a lithium ion battery, a lithium polymer battery, a lead acid battery, nickel cadmium battery, a nickel metal hydride battery, etc.

The wireless charger (or charging unit) 420 similarly includes a charger printed circuit board 422, a charger induction coil 424, and a charger power input port 428 in electrical connection with each other. The induction coil 424 (e.g., copper or other suitable metal or electrically conductive wire/coil) is adapted to inductively couple with the induction coil 414 of the remote control 410 (e.g., to induce a current in the remote control coil 414 and charge the remote control battery 416 when current is passed through the induction coil 424). The power input port 428 can be a USB power input port (e.g., accepting 5V input power). In some embodiments, the wireless charger 420 is separate from the mattress support surface 100 and corresponding support structure for the adjustable bed 10 (e.g., a standalone unit that is not part of or otherwise affixed to an adjustable foundation or bed frame component). In a refinement, the USB power input port 428 can be electrically coupled (e.g., wired) to a USB power output port of the adjustable bed 10 (e.g., which is in turn coupled to the power supply 250). In other embodiments, the wireless charger 420 is integrated with the mattress support surface 100 or a corresponding support structure for the adjustable bed 10 (e.g., further electrically coupled to the power supply 250 as an integrated peripheral of the adjustable bed 10).

In some embodiments, the adjustable bed 10 can include one or more pulse width modulator (PWM) units to control or regulate the DC output power level from the power supply 250 to one or more peripheral components of the adjustable bed. The DC output power level of the power supply 250 is suitably 24V or 36V DC to provide enough power to operate the actuator motors 240 used to adjust to the position of the deck support sections 110 with a load thereon. Suitably, however, other peripheral components of the adjustable bed are desirably powered by the power supply 250, but they might require or otherwise benefit from lower input voltages to operate efficiently and/or without risk of damage to the peripheral component. The PWM units (e.g., incorporated into the power supply 250 or coupled thereto as an additional electronic component) are known in the art and can be formed from a PWM circuit using a suitable timer such as a monostable 555 timer. The PWM units are adapted to reduce the delivery voltage of the power supply 250 before powering a corresponding peripheral component of the adjustable bed. For example, a peripheral component of the adjustable bed 10 is in electrical communication (e.g., wired) with the power supply 250 and a corresponding PWM unit. The peripheral component is adapted to receive a DC source of input power at a voltage less than the delivery voltage (e.g., a voltage which is down-regulated by the PWM from the power supply 250 delivery voltage). The down-regulated voltages from the PWM units can be any suitable value, depending on the corresponding peripheral component, such as 24V, 12V, 5V, or 3.3V. Example peripheral components and common suitable input voltages include an actuator motor (e.g., 24V or 36V input, for example directly receiving the delivery voltage from the power supply 250 or a down-regulated voltage via a PWM unit in some embodiments), a vibrator motor (e.g., 12V or 24V input), lights (e.g., bed-mounted (LED) lights; 24V, 12V, or 5V input), audio and/or visual system (e.g., speakers/audio player and/or video player; 24V, 12V, or 5V input), a control box (e.g., PLC controller; 36V, 24V, 12V, or 5V input), a wireless charger unit (e.g., 12V, 5V, or 3.3V input), and a USB charging port (e.g., 5V or 3.3V input).

In some embodiments, the adjustable bed 10 can include a rechargeable or non-rechargeable battery as a backup to the power supply 250. The backup battery can be incorporated into the power supply 250 or included as a separate component mounted to a support structure of the adjustable bed 10 such as the frame 200 or other foundation 20 component. The backup battery is adapted to deliver a direct current (DC) source of output power at a delivery voltage to one or more peripheral components of the adjustable bed 10 in electrical connection therewith. The backup battery suitably has sufficient charge to provide semi long-term operation of the adjustable bed 10 (e.g., at least 1 day and/or up to 2, 3, or 5 days of operation including deck support section 110 articulation) in the absence of mains power through the power supply 250. This can be particularly desirable in areas susceptible to mains power supply interruptions. The backup battery similarly provides power to the adjustable bed 10 when all of its components are idle (e.g., no deck support section 110 articulation, no vibration motor operation, no lights operation, no active operation of other peripherals such as audio, video, etc.) and the power supply 250 is off or otherwise not supplying power to the bed 10 components. In this case, the backup battery still provides power to the controller/control box 252, thus allowing the controller/control box 252 to respond to a "wake" command from the remote control 410, which resumes active mains power consumption by the power supply 250 to provide output power to the bed 10 components. The delivery voltages of the power supply 250 (when in full operation) and the backup battery suitably are 24V and 36V, and the power supply 250 is commonly at the same or higher delivery voltage than the backup battery. The delivery voltage of the backup battery is suitably 24V. Examples of suitable backup batteries include a lithium ion battery, a lithium polymer battery, a lead acid battery, nickel cadmium battery, and a nickel metal hydride battery (e.g., a 24V battery).

Rawls-Meehan U.S. Pat. Nos. 7,321,811, 7,465,280, 7,805,785, 7,930,783, 7,933,669, 7,979,169, 8,019,486, 8,032,263, 8,032,960, 8,046,114, 8,046,115, 8,046,116, 8,046,117, 8,050,805, 8,069,512, 8,078,336, 8,078,337, 8,150,562, 8,375,488, 8,565,934, and 8,682,457 as well as Rawls-Meehan U.S. Publication No. 2012/0057685 are incorporated herein by reference in their entireties and variously disclose mattresses including foam springs or foam cells and materials/configurations therefor, adjustable bed assemblies including adjustable mattress frames, electrical, mechanical, and electronic components associated therewith, and remote controls for use therewith, all of which may be used individually or collectively in combination with the adjustable bed described herein.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

PARTS LIST 10 adjustable bed (including mattress support 100, adjustable frame 200, mattress 300, and friction system 400)
20 adjustable foundation (including mattress support 100, adjustable frame 200, and deck friction-enhancing material 410)
100 mattress support (or deck) surface
110 deck support (sections 110A-D as foot, leg, bottom, and back/head portions; longitudinally opposed ends $110A_1$ and $110A_2$, $110B_1$ and $110B_2$, $110C_1$ and $110C_2$, $110D_1$ and $110D_2$)
112 top surface of deck support (sections 112A-D as for deck support)
200 adjustable (bed) frame
210 frame support (sections 210A-D as for deck support)
220 support member
230 subframe
240 actuator and motor therefor or movement/articulation means
242 massage/vibration motor
250 power supply (e.g., AC-to-DC converter)
252 adjustable bed controller or control box for sending/receiving bed control commands
300 mattress (300A: foot end; 300D: head end)
305 containment frame
310 base
320 sidewalls
330 endwalls
340 foam cells or foam springs
400 remote control wireless charging system
410 wireless remote control
412 remote printed circuit board
414 remote induction coil
416 remote rechargeable battery
418 remote power input
420 wireless charging unit
422 charger printed circuit board
424 charger induction coil
428 charger power input
X (local) lateral direction
Y (local) longitudinal direction
Z (local) normal direction
P pivot axis
Θ angle of articulation between adjacent sections

What is claimed is:

1. An adjustable bed comprising:
(a) a mattress support surface comprising (i) a first deck support section, and (ii) a second deck support section pivotally attached to the first deck support section;
(b) a power supply adapted to receive a continuous source of input power and adapted to deliver a direct current (DC) source of output power at a delivery voltage;
(c) a first peripheral adjustable bed component in electrical communication with the power supply and adapted to receive a DC source of input power at the delivery voltage;
(d) a second pulse width modulator (PWM) adapted to reduce the delivery voltage of the power supply;
(e) a second peripheral adjustable bed component in electrical communication with the power supply and the second PWM, the second peripheral adjustable bed component being adapted to receive a DC source of input power at a second voltage that is down-regulated by the second PWM and less than the delivery voltage;
(f) a third pulse width modulator (PWM) adapted to reduce the delivery voltage of the power supply; and
(e) a third peripheral adjustable bed component in electrical communication with the power supply and the third PWM, the third peripheral adjustable bed component being adapted to receive a DC source of input power at a third voltage that is down-regulated by the third PWM, less than the delivery voltage, and different from the second voltage.

2. The adjustable bed of claim 1, wherein the delivery voltage is selected from the group consisting of 24V and 36V.

3. The adjustable bed of claim 2, wherein the second voltage and the third voltage are independently selected from the group consisting of 24V, 12V, 5V, and 3.3V.

4. The adjustable bed of claim 3, wherein the first, second, and third peripheral adjustable bed components are selected from the group consisting of an actuator motor, a vibrator motor, lights, audio and/or visual system, a control box, a wireless charger unit, and a USB charging port.

5. The adjustable bed of claim 1, wherein:
the first peripheral adjustable bed component is an actuator motor;
the delivery voltage is selected from the group consisting of 24V and 36V;
the second peripheral adjustable bed component is a vibrator motor;
the second voltage is selected from the group consisting of 24V and 12V;

the third peripheral adjustable bed component is selected from the group consisting of lights, audio and/or visual system, a wireless charger unit, and a USB charging port;

the third voltage is selected from the group consisting of 12V, 5V, and 3.3V; and the adjustable bed further comprises a control box in electrical communication with the power supply and adapted to receive a DC source of input power at the delivery voltage, the second voltage, or the third voltage.

6. The adjustable bed of claim 1, wherein:

the first peripheral adjustable bed component is an actuator motor; and the second and third peripheral adjustable bed components are selected from the group consisting of a vibrator motor, lights, an audio and/or visual system, a control box, a wireless charger unit, and a USB charging port.

7. The adjustable bed of claim 1, further comprising a mattress having an outer bottom surface and positioned above the mattress support surface.

8. The adjustable bed of claim 1, wherein the mattress support surface further comprises (iii) a third deck support section pivotally attached to the second deck support section.

9. An adjustable bed comprising:
(a) a mattress support surface comprising (i) a first deck support section, and (ii) a second deck support section pivotally attached to the first deck support section;
(b) a power supply adapted to receive a continuous source of input power and adapted to deliver a direct current (DC) source of output power at a delivery voltage;
(c) a first pulse width modulator (PWM) adapted to reduce the delivery voltage of the power supply;
(d) a first peripheral adjustable bed component in electrical communication with the power supply and the first PWM, the first peripheral adjustable bed component being adapted to receive a DC source of input power at a first voltage that is down-regulated by the first PWM and less than the delivery voltage;

(e) a second pulse width modulator (PWM) adapted to reduce the delivery voltage of the power supply; and
(f) a second peripheral adjustable bed component in electrical communication with the power supply and the second PWM, the second peripheral adjustable bed component being adapted to receive a DC source of input power at a second voltage that is down-regulated by the second PWM, less than the delivery voltage, and different from the first voltage.

10. The adjustable bed of claim 9, wherein the delivery voltage is selected from the group consisting of 24V and 36V.

11. The adjustable bed of claim 9, wherein the first voltage and the second voltage are independently selected from the group consisting of 24V, 12V, 5V, and 3.3V.

12. The adjustable bed of claim 9, wherein:

the delivery voltage is selected from the group consisting of 24V and 36V;

the first peripheral adjustable bed component is a vibrator motor;

the first voltage is selected from the group consisting of 24V and 12V;

the second peripheral adjustable bed component is selected from the group consisting of lights, an audio and/or visual system, a wireless charger unit, and a USB charging port;

the second voltage is selected from the group consisting of 12V, 5V, and 3.3V; and the adjustable bed further comprises a control box in electrical communication with the power supply and adapted to receive a DC source of input power at the delivery voltage, the first voltage, or the second voltage.

13. The adjustable bed of claim 9, further comprising a mattress having an outer bottom surface and positioned above the mattress support surface.

14. The adjustable bed of claim 9, wherein the mattress support surface further comprises (iii) a third deck support section pivotally attached to the second deck support section.

* * * * *